United States Patent
Drewes

(10) Patent No.: US 9,022,485 B2
(45) Date of Patent: May 5, 2015

(54) WHEEL BEARING ASSEMBLY HAVING A CENTERING DEVICE FOR VEHICLES

(75) Inventor: Olaf Drewes, Aschaffenburg (DE)

(73) Assignee: SAF-Holland GmbH, Bessenbach (DE)

( * ) Notice: Subject to any disclaimer, the term of this patent is extended or adjusted under 35 U.S.C. 154(b) by 363 days.

(21) Appl. No.: 13/379,565

(22) PCT Filed: Jun. 16, 2010

(86) PCT No.: PCT/EP2010/058453
§ 371 (c)(1),
(2), (4) Date: Jan. 19, 2012

(87) PCT Pub. No.: WO2010/149552
PCT Pub. Date: Dec. 29, 2010

(65) Prior Publication Data
US 2012/0104837 A1 May 3, 2012

(30) Foreign Application Priority Data

Jun. 22, 2009 (DE) .......................... 10 2009 027 082

(51) Int. Cl.
*B60B 27/02* (2006.01)
*B60B 27/00* (2006.01)
*B60B 7/06* (2006.01)

(52) U.S. Cl.
CPC ............... *B60B 27/001* (2013.01); *B60B 7/066* (2013.01)

(58) Field of Classification Search
CPC ............ B60B 3/14; B60B 3/16; B60B 3/147; B60B 7/0013; B60B 7/066; B60B 27/00; B60B 27/0005; B60B 27/001; B60B 27/02
USPC .......... 301/9.1, 10.1, 35.621, 35.627, 64.102, 301/108.1, 108.4, 105.1, 109, 110
See application file for complete search history.

(56) References Cited

U.S. PATENT DOCUMENTS

| | | | | |
|---|---|---|---|---|
| 4,421,197 | A | * | 12/1983 | Chandioux .................... 180/258 |
| 4,764,153 | A | | 8/1988 | Jacob |
| 5,333,939 | A | * | 8/1994 | Krude et al. ................ 301/124.1 |
| 5,806,936 | A | | 9/1998 | Guimbretiere |
| 5,975,647 | A | * | 11/1999 | Pons et al. .................. 301/108.1 |
| 6,758,531 | B1 | * | 7/2004 | Bullard ........................ 301/37.21 |
| 7,922,262 | B2 | * | 4/2011 | Savarese et al. ............. 301/105.1 |
| 2003/0062764 | A1 | * | 4/2003 | Vignotto et al. ............. 301/105.1 |
| 2003/0102711 | A1 | * | 6/2003 | Vignotto et al. .......... 301/35.627 |
| 2005/0162000 | A1 | * | 7/2005 | Goettker .................... 301/108.1 |

FOREIGN PATENT DOCUMENTS

| | | |
|---|---|---|
| CN | 1550357 | 12/2004 |
| CN | 100394057 | 6/2008 |
| DE | 9116414 U1 * | 9/1992 |
| DE | 19637940 A1 | 3/1997 |
| DE | 102006029604 A1 | 12/2007 |
| EP | 0237794 A2 | 9/1987 |
| FR | 2687614 A1 * | 8/1993 |
| GB | 2192959 A | 1/1988 |

* cited by examiner

*Primary Examiner* — Kip T Kotter
(74) *Attorney, Agent, or Firm* — Price Heneveld LLP

(57) ABSTRACT

A wheel bearing assembly with a centering device that includes a wheel hub arranged rotatably on an axle body about an axis of rotation. The assembly further includes a centering unit fixed to the wheel hub, wherein the centering unit has a centering portion, and wherein the distance of the centering portion to the axis of rotation is smaller than the distance of the outer periphery of the wheel hub to the axis of rotation.

18 Claims, 3 Drawing Sheets

WHEEL BEARING ASSEMBLY HAVING A CENTERING DEVICE FOR VEHICLES

BACKGROUND OF THE INVENTION

The present invention relates to a wheel hub or wheel bearing assembly with a centering device for vehicles, such as commercial vehicles or farm vehicles.

Wheel hub or wheel bearing assemblies of the type in question are known from the prior art. For example, DE 100 49 615 A1 discloses a wheel hub or wheel bearing assembly having a wheel hub which is supported rotatably on an axle body. In order to center the wheel, the wheel hub comprises a recess. A problem of such wheel hub or wheel bearing assemblies, however, is that due to the centering projection in the wheel hub the minimum diameter of the central opening of the wheel rim is limited. In order to overcome this problem, there exist wheel hub or wheel bearing assemblies with a centering device which is smaller than the inner diameter of the wheel hub, by arranging a pot-shaped brake disc upstream of the bearing assembly, which brake disc has a corresponding centering seat of a smaller diameter. However, a problem of such systems is that the wheel bearing unit is subject to enormous thermal stresses since the pot of the pot-shaped brake disc shields the wheel bearing unit from cooling from the outside and, in addition, heat may be introduced directly into the wheel bearing unit during the braking process.

Therefore, the object underlying the present invention is to provide a wheel hub or wheel bearing assembly with a centering device for vehicles, such as commercial vehicles or farm vehicles, which may be adjusted flexibly to the wheel rims to be arranged thereon without exerting a negative thermal influence on the wheel bearing system.

DE 10 2006 029 604 A1 relates to a wheel bearing for a motor vehicle comprising an outer ring with a radial wheel flange and at least one inner ring, between which rings rolling bodies are arranged in tracks in such a way that they can be rolled along, and with an axial centering portion onto which a wheel rim as well as a brake disc may be mounted.

DE 19 637 940 A1 relates to a hub for a driving wheel with an axial recess for a screw or nut for attaching a driving device on the hub.

EP 0 237 794 A2 relates to a bearing arrangement with a bearing inner ring manufactured as a single piece, which comprises a fissure seam, which is arranged between the two tracks of the bearing inner ring.

SUMMARY OF THE INVENTION

According to the invention there is provided a wheel hub or wheel bearing assembly with a centering device for vehicles, such as commercial vehicles or farm vehicles, comprising a wheel hub which can be arranged on an axle body rotatably about an axis of rotation and to which a wheel can be fastened, and a centering unit which can be fixed to the wheel hub, wherein the centering unit comprises a centering portion on which the wheel can be arranged, and wherein the distance of the centering portion to the axis of rotation is smaller than the distance of the outer periphery of the wheel hub to the axis of rotation. Thus, the wheel hub or wheel bearing assembly serves in particular for supporting a wheel on a vehicle axis or an axle body of a motor vehicle, in particular of a farm vehicle. Said vehicles are, in particular, semi-trailers, for example, which are drawn by a truck in order to transport heavy loads, or commercial vehicles in the form of trucks themselves. Consequently, the wheel hub or wheel bearing assembly can be designed as a commercial vehicle wheel bearing assembly. The axle body is essentially arranged rigidly or non-rotatably or non-turnably on the frame of the vehicle such that the wheel hub is arranged on the axle body rotatably or turnably about an axis of rotation. Here, the axis or center of rotation essentially corresponds to the longitudinal axis of the axle body or of the axis of rotation of the wheel of the vehicle, respectively. The wheel of the vehicle is arranged rotatably on the axle body via the wheel hub. To this end, a centering unit is provided in order to center the wheel relative to the axis of rotation or to fix its (radial) position relative to the axis of rotation. Accordingly, the centering unit comprises a centering portion on which the wheel may be arranged. Here, the centering portion is designed such that, at least partially, it fits or is congruent to a certain geometrical configuration of the wheel or wheel rim. In particular, said centering portion is a central hole or a central opening or recess in the wheel. Advantageously, the distance of the centering portion to the axis of rotation is smaller than the distance of the outer periphery of the wheel hub to the axis of rotation. Thus, in the case of a circular configuration of the centering portion, its diameter is smaller than the outer diameter of the wheel hub. The centering unit may be designed single-part or single-piece or multi-part or multi-piece. In particular, however, the centering unit is designed as an element separate from the wheel hub, wherein, thus, it is arranged on the wheel hub in such a way that it can be released or disassembled or remounted. Thus, the centering unit can be easily replaced in case it is damaged. Expediently, the centering portion is provided on a distal side or surface of the centering unit or on a side or surface of the centering unit extending outwards. "Distal" means here oriented away from the center of the axle so that the centering portion is visible from outside of the vehicle.

Advantageously, the wheel hub or wheel bearing assembly further comprises a bearing assembly by means of which the wheel hub is supported rotatably around the axle body. Said bearing assembly may be designed as a rolling bearing or sliding bearing assembly. The bearing assembly ensures that the wheel hub is rotatable or turnable around the axis of rotation or longitudinal axis of the axle body.

Expediently, the bearing assembly comprises an inner bearing ring on which at least one outer bearing ring is rotatably arranged by means of at least one bearing body. The inner bearing ring, preferably, is securely attached to or axially fixed on the axle body. By contrast, the outer bearing ring is fixed on the wheel hub. The inner and/or outer bearing rings may be designed single-part or multi-part. Thus, the inner bearing ring may be designed two-part, viz. comprising a distal inner bearing ring and a proximal inner bearing ring, which are connected to one another by means of a radial clamping ring. Preferably, the bearing bodies may be designed as rolling bearing bodies, such as cylinders or tapered rollers. In order to be able to ensure that the bearing assembly operates reliably, it can be secluded by means of sealing elements such that dirt or other particles may not penetrate into the bearing.

The distance of the centering portion to the axis of rotation may be set smaller than the distance of the outer periphery of the bearing assembly to the axis of rotation. To put it differently, the distance of the centering portion to the axis of rotation is smaller than the radius of the outer circumference of the bearing assembly, in particular of the outer bearing ring. Thus, when the centering portion is designed rotationally symmetric, its diameter is smaller than the outer diameter of the outer bearing ring. Here, the distance of the centering portion to the axis of rotation is smaller than the outer radius of the bearing device, in particular by at least the wall thickness of the centering unit in this area.

The centering portion may also be designed rotationally symmetric, wherein the relationship of the diameter of the centering portion to the outer diameter of the bearing assembly amounts to about 0.65 to 0.96, preferably about 0.85 to 0.94, and particularly preferably about 0.92. Due to this optimal relationship it becomes possible to arrange a particularly stable wheel rim without having to change or reduce the size of the axle body, of the wheel hub or of the bearing assembly, which makes the system even more operationally reliable.

In one embodiment, the centering unit is designed cup-shaped and comprises a floor portion and a circumferential portion. To put it differently, the centering unit may be designed essentially cylindrical or tapering slightly with a preferably closed floor. In this case, the circumferential portion extends essentially transversely, preferably perpendicularly, away from the floor portion. In this context, the term "cup-shaped" only refers to a basic configuration of the centering unit. As a matter of course, the centering unit may have a plurality of further integral portions or sections which differ from the cup-shape.

Expediently, the centering portion is formed by an essentially rotationally symmetric outer circumference of the circumferential portion of the centering unit. Here, the centering portion may have an essentially cylindrical configuration. Alternatively, the centering portion may taper towards a distal end or towards the outside, respectively, so that the centering portion is determined essentially by the surface of a cone outer surface. As a matter of course, the centering portion need not be continuous in the circumferential direction, but may also be designed as a sequence of circular arc portions which have the same distance from the axis of rotation. In particular, the centering portion is designed essentially coaxial or concentric to the axis of rotation.

In the assembled state of the centering unit, the circumferential portion may engage with a distal end portion of the bearing assembly, preferably of the outer bearing ring, such that the bearing assembly, preferably the outer bearing ring, is axially fixed relative to the wheel hub. To put it differently, the proximally oriented part of the circumferential portion of the centering unit may be made to engage with a distal end of the bearing assembly in order to prevent or limit, respectively, an axial displacement of the bearing assembly in the distal direction. Therefore, the end face of the circumferential portion may be brought into contact with the end face of the bearing assembly or with the end face of the outer bearing ring, respectively. In another embodiment, the proximal end of the bearing assembly or of the outer bearing ring, respectively, may be made to engage with a flange or projection of the wheel hub, which flange or projection is preferably designed radial, so that an axial displacement of the bearing assembly in the proximal direction is limited.

The centering unit may further comprise a flange portion which preferably extends radially away from the circumferential portion, towards the outside. The flange portion may extend transversely away from the circumferential portion and, particularly advantageously, it extends essentially perpendicularly away from the circumferential portion. To put it differently, the flange portion is essentially perpendicular or orthogonal to the axis of rotation. The outer diameter of the flange portion, advantageously, is smaller than or equal to the outer diameter of the wheel hub. The flange portion may comprise holes or recesses or apertures through which the wheel bolts for fastening the wheel may grip or be guided in order to engage with the wheel hub. Furthermore, the wheel flange may comprise one or more further holes of a smaller diameter so as to arrange a fastening means for fixing the centering unit on the wheel hub. As a result, the assembly process is simplified and there are provided a transportation safety device and a device for securing the centering unit on the wheel hub without a wheel being attached thereto.

Advantageously, the floor portion of the centering unit comprises an opening which is preferably concentric to the axis of rotation and which may be dosed by a closure element. When the wheel hub or wheel bearing assembly is assembled, access to the axle body is possible through said opening, for example in order to introduce a lubricant. The opening may also be designed as a mere recess in which a corresponding cap designed as a closure element may be arranged.

In another embodiment, the centering unit comprises engaging means which are designed to engage with the wheel hub so that the centering unit may be easily assembled and disassembled. The engaging means may be designed for example as external threads on the circumferential portion of the centering unit in the area of the free end thereof, which end is adapted to engage with a corresponding internal thread on the inner circumference of the wheel hub. Additionally or alternatively, there may be provided on the outer circumferential portion a radial groove or a radial recess which comes to engage with a radial projection or a radial groove, respectively, arranged on the inner circumference of the wheel hub, in order to fix the centering unit on the wheel hub. Additionally or alternatively, there may also be provided screws/bolts, studs, rivets or similar elements which preferably extend through openings in the flange portion of the centering unit and which are being fastened to the wheel hub. Advantageously, the engaging means also make it possible to prevent damage to the components of the wheel hub unit due to thermal influences or a partial heating, respectively, as is the case in the solutions known from the prior art, where the centering unit is firmly bonded and unreleasably fastened to the wheel hub (e.g. by means of welding or brazing/soldering).

Further advantages and features of the invention become apparent from the following description of exemplary embodiments of the wheel bearing assembly according to the invention with reference to the appended Figures, wherein individual features of different embodiments may be combined to form new embodiments.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
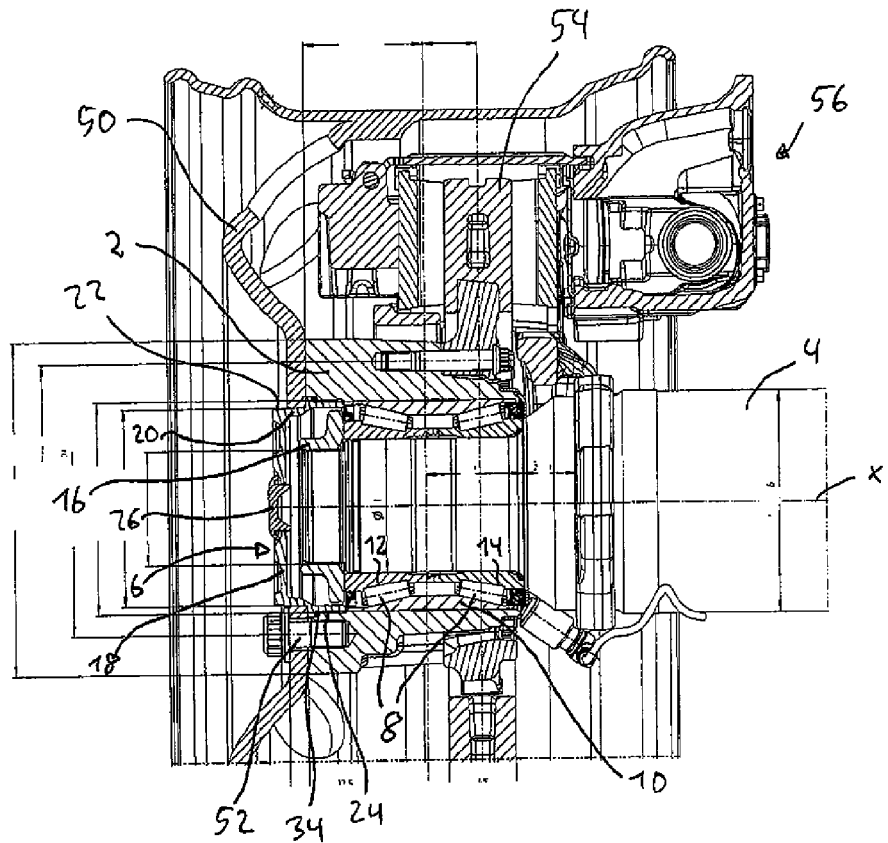
FIG. 1 is a cross-sectional view of one embodiment of the wheel hub or wheel bearing assembly according to the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

Figure 2:
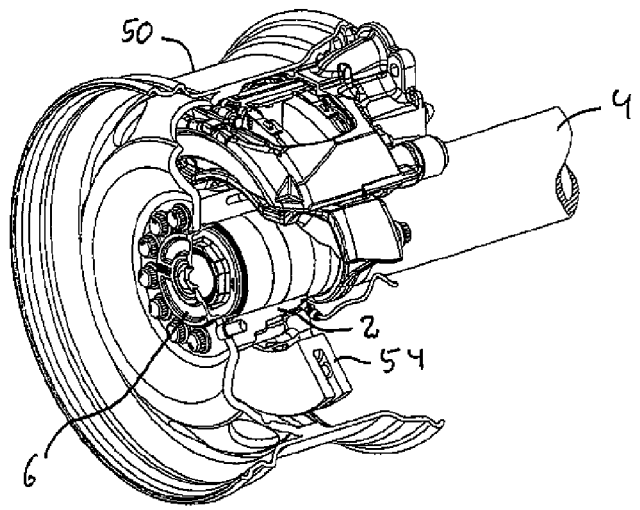
FIG. 2 is a partial cross-sectional perspective view of the wheel hub or wheel bearing assembly according to FIG. 1.

FIGS. 1 and 2 show a first exemplary embodiment of a wheel hub or wheel bearing assembly according to the invention, comprising a centering device for wheels to be attached thereto. The wheel hub or wheel bearing assembly comprises a wheel hub 2, which is arranged on an axle body 4 rotatably about an axis of rotation x. In order to attach the wheel rim 50 of a wheel to the wheel hub or wheel bearing assembly, the latter additionally comprises a centering unit 6 which is attached to the wheel hub 2.

The axle body 4 is connected to the frame of the vehicle in an essentially non-rotatable or non-turnable manner. On the axle body 4, there is provided a bearing assembly consisting of an inner bearing unit, a plurality of bearing bodies 8 and an outer bearing ring 10. Here, the inner bearing unit consists of a distal inner bearing ring 12 and a proximal inner bearing ring 14 which are attached to one another by means of a radial clamping ring. An axial nut 16 is used to axially fix and attach the inner bearing ring 12, 14 to the axle body 4. The outer bearing ring 10 is connected to the wheel hub 2.

The wheel rim 50 is attached to the wheel hub 2 by means of wheel bolts 52. At a proximal portion of the wheel hub 2, there is further arranged a brake disc 54 which may be actuated by means of a brake unit 56 attached to the frame of the vehicle or to the axle body 4, respectively.

In order to center the wheel rim 50 with respect to the wheel hub 2 or the axis of rotation x, respectively, the centering unit 6 is arranged on the wheel hub 2. The centering unit 6 is designed essentially cup- or pot-shaped and comprises a floor portion 18 and a circumferential portion 20. In the embodiment shown, the circumferential portion 20 is essentially designed as a stepped cylinder and, on a circumferential outer surface, comprises a centering portion 22 where the wheel rim 50 is slid on and centered relative to the axis of rotation x. On the outer circumferential surface of the circumferential portion 20, the centering unit 6 comprises engaging means 24 in the form of a thread for screwing it together with a corresponding internal thread of the wheel hub 2. As a result, it becomes possible that the end face of the circumferential portion 20 engages with the end face of the outer bearing ring 10 and, thus, braces it with the wheel hub 2 and securely fixes it thereto.

In order to ensure that the axle body 4 and the axle nut 16 are accessible, the floor portion 18 of the centering unit 6 comprises an expediently concentric opening which is closed by a closure element 26.

Figure 3:
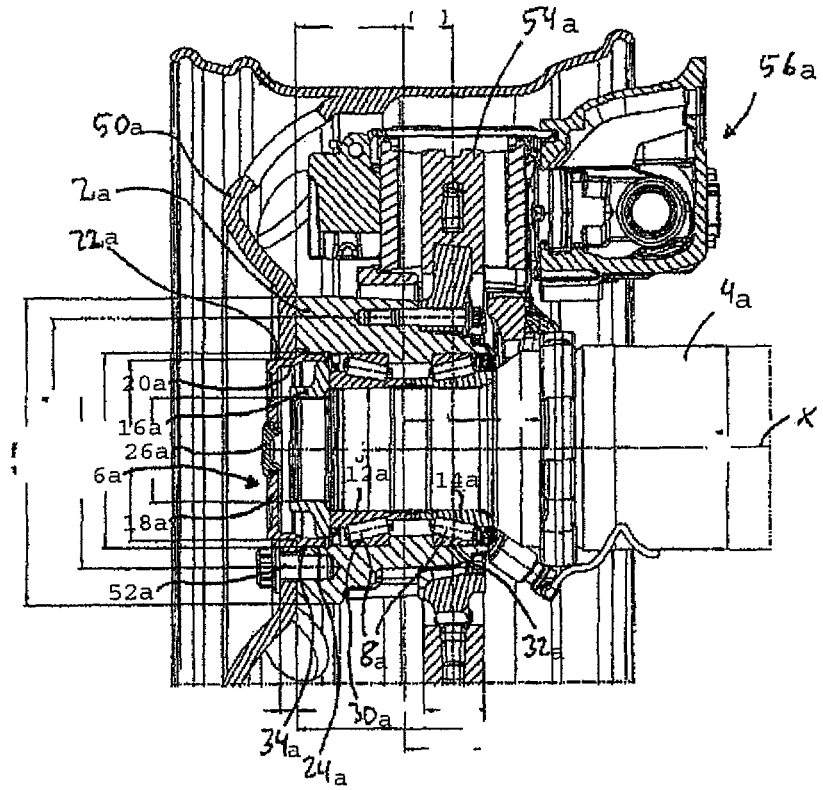
FIG. 3 is a cross-sectional view of another embodiment of the wheel hub or wheel bearing assembly according to the invention.
Figure 4:
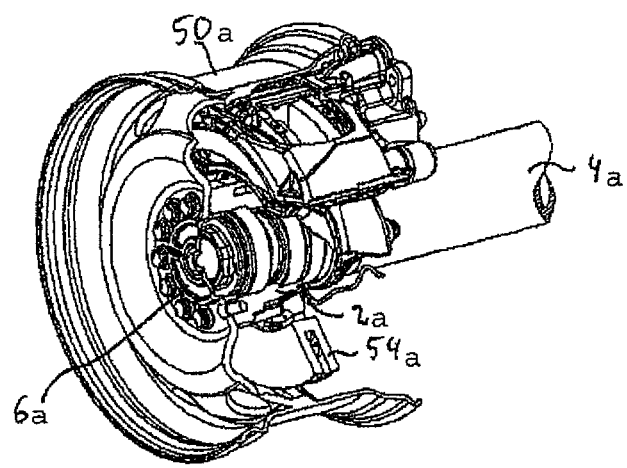
FIG. 4 is a partial cross-sectional perspective view of the wheel hub or wheel bearing assembly according to FIG. 3.

FIGS. 3 and 4 show an alternative exemplary embodiment of the wheel hub or wheel bearing assembly according to the invention, wherein the same reference signs are used as in the embodiment of FIGS. 1 and 2 to denote identical or similar elements, except for the suffix "a" in the numerals of the latter.

In contrast to the embodiment shown in FIGS. 1 and 2, the bearing assembly of the embodiment shown in FIGS. 3 and 4 comprises a multi-piece outer bearing ring which is designed from a distal outer bearing ring 30a and a proximal outer bearing ring 32a, which are each supported on a shoulder or an inwards protruding radial projection of the wheel hub 2a.

Particularly, there may be provided between a projection of the centering unit 6a and the wheel hub 2a sealing element 34a in order to prevent that liquids penetrate from the outside into the space formed between the axle body 4a, the axle nut 16a and the centering unit 6a.

Figure 5:
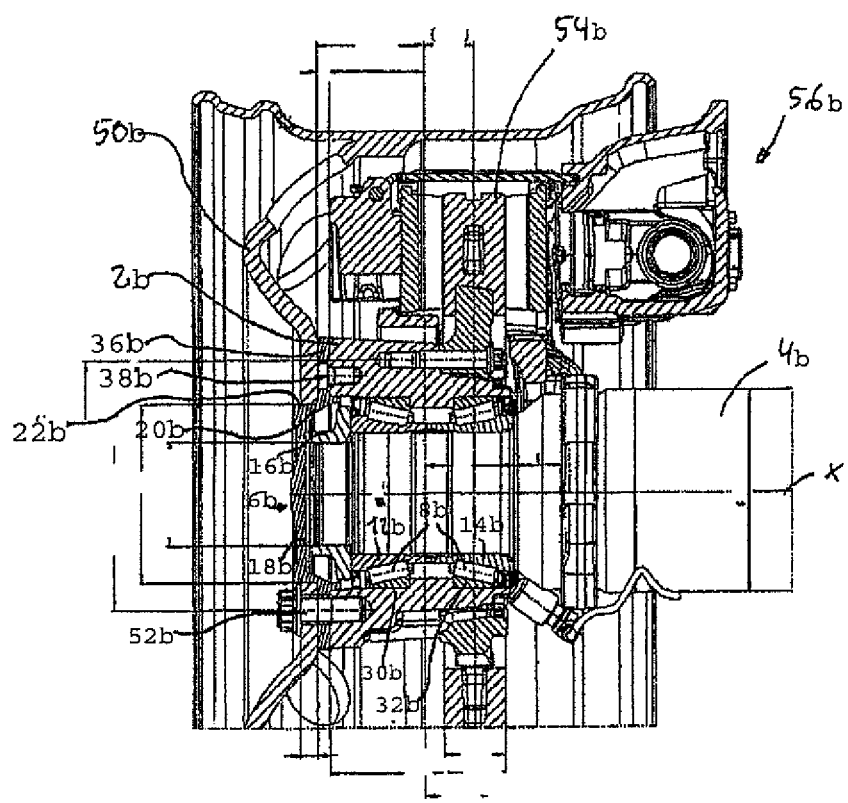
FIG. 5 is a cross-sectional view of a further embodiment of the wheel hub or wheel bearing assembly according to the invention.
Figure 6:
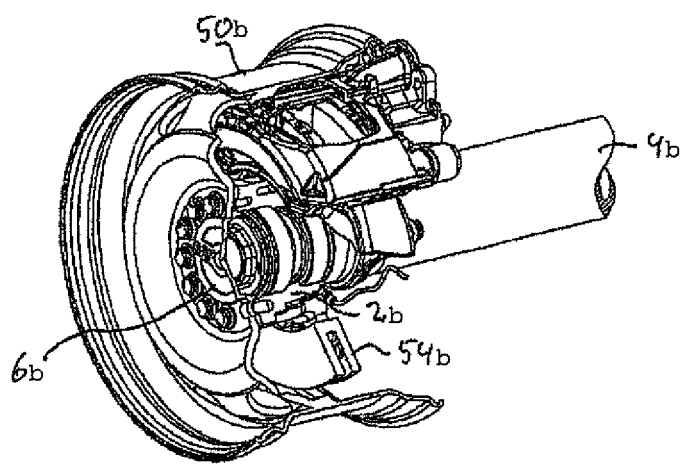
FIG. 6 is a partial cross-sectional perspective view of the wheel hub or wheel bearing assembly according to FIG. 5.

FIGS. 5 and 6 show a further exemplary embodiment of the wheel hub or wheel bearing assembly according to the invention, wherein the same reference signs are used as in the embodiments of FIGS. 1 to 4 to denote identical or similar elements, except for the suffix "b" in the numerals of the latter.

In contrast to the embodiments shown in FIGS. 1-4, the embodiment of the wheel hub or wheel bearing assembly shown in FIGS. 5 and 6 comprises a centering unit 6b with a flange portion 36b which extends essentially perpendicular to the axis of rotation x radially outwards, away from the circumferential portion 20b.

In the flange portion 36b, a plurality of openings is provided along the periphery. In another embodiment, the openings of the flange portion 36b have two different configurations. On the one hand, there are provided openings through which the wheel bolt 52b grips in order to attach the wheel rim 50b to the wheel hub 2b. On the other hand, there are provided openings into which fastening means 38b engage, which may be designed as bolts/screws or the like, for example, in order to fix the centering unit 6b on the wheel hub 2b.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A wheel bearing assembly for a vehicle, comprising:
    a wheel hub arranged rotatably on an axle body about an axis of rotation and to which a wheel is adapted to be fastened;
    a centering unit configured to be fixed to the wheel hub, wherein the centering unit comprises a fastening or engaging member that includes at least one of threads, screws, bolts, studs or rivets adapted for engagement with the wheel hub to fix the centering unit on the wheel hub for assembly and disassembly, and further wherein the centering unit comprises a centering portion configured for arrangement of a wheel thereon, wherein the centering unit is configured to determine the position and center the wheel with respect to the wheel hub; and
    a bearing assembly adapted to support rotational movement of the wheel hub around the axle body, wherein the bearing assembly includes an inner bearing ring, at least one bearing body and at least one outer bearing ring comprising an outer periphery that is rotatably arranged on the inner bearing ring via the at least one bearing body,
    wherein the distance of the centering portion to the axis of rotation is less than the distance of the outer periphery of the wheel hub to the axis of rotation, wherein the distance of the centering portion to the axis of rotation is less than the distance of the outer periphery of the outer bearing ring of the bearing assembly to the axis of rotation, and further wherein the centering unit includes a circumferential portion that is engaged by the wheel and the circumferential portion engages a distal end portion of the outer bearing ring of the bearing assembly.

2. The wheel bearing assembly for a vehicle according to claim 1, wherein the centering portion comprises an outer diameter and is configured to be rotationally symmetric, the bearing assembly comprises an outer diameter, and the ratio of the outer diameter of the centering portion to the outer diameter of the bearing assembly is about 0.65 to 0.96.

3. The wheel bearing assembly for a vehicle according to claim 2, wherein the ratio of the outer diameter of the centering portion to the outer diameter of the bearing assembly is about 0.85 to 0.94.

4. The wheel bearing assembly for a vehicle according to claim 3, wherein the ratio of the outer diameter of the centering portion to the outer diameter of the bearing assembly is about 0.92.

5. The wheel bearing assembly for a vehicle according to claim 2, wherein the centering unit is further arranged in a cup-like configuration that includes a floor portion and a circumferential portion.

6. The wheel bearing assembly for a vehicle according to claim 5, wherein the centering portion is further defined by a substantially rotationally symmetric outer circumference of the circumferential portion.

7. The wheel bearing assembly for a vehicle according to either one of claims 5 and 6, wherein the circumferential portion of the centering unit operably engages a distal end portion of the bearing assembly such that the bearing assembly is fixed relative to the wheel hub in the direction parallel to the axle body.

8. The wheel bearing assembly for a vehicle according to claim 6, wherein the centering unit further comprises a flange portion.

9. The wheel bearing assembly for a vehicle according to claim 6, wherein the floor portion of the centering unit comprises an opening that is concentric to the axis of rotation and adapted for closure by a closure element.

10. The wheel bearing assembly for a vehicle according to claim 7, wherein the floor portion of the centering unit comprises an opening that is concentric to the axis of rotation and adapted for closure by a closure element.

11. The wheel bearing assembly for a vehicle according to claim 5, wherein the centering unit further comprises a flange portion.

12. The wheel bearing assembly for a vehicle according to claim 5, wherein the floor portion of the centering unit comprises an opening that is concentric to the axis of rotation and adapted for closure by a closure element.

13. The wheel bearing assembly for a vehicle according to claim 1, wherein the centering unit is further arranged in a cup-like configuration that includes a floor portion and a circumferential portion.

14. A wheel bearing assembly for a vehicle, comprising:
a wheel hub arranged rotatably on an axle body about an axis of rotation and to which a wheel is adapted to be fastened;
a centering unit adapted to be fixed to the wheel hub, wherein the centering unit comprises a fastening or engaging member that includes at least one of threads, screws, bolts, studs or rivets adapted for engagement with the wheel hub to fix the centering unit on the wheel hub for assembly or disassembly, and further wherein the centering unit comprises a centering portion adapted for arrangement of a wheel thereon; and
a bearing assembly adapted to support rotational movement of the wheel hub around the axle body, wherein the bearing assembly includes an inner bearing ring, at least one bearing body and at least one outer bearing ring comprising an outer periphery that is rotatably arranged on the inner bearing ring via the at least one bearing body,
wherein the distance of the centering portion to the axis of rotation is less than the distance of the outer periphery of the wheel hub to the axis of rotation, and further wherein the distance of the centering portion to the axis of rotation is less than the distance of the outer periphery of the outer bearing ring of the bearing assembly to the axis of rotation; and
wherein the centering portion comprises an outer diameter and is configured to be rotationally symmetric, the bearing assembly comprises an outer diameter, and the ratio of the outer diameter of the centering portion to the outer diameter of the bearing assembly is about 0.65 to 0.96, wherein the centering unit is further arranged in a cup-like configuration that includes a floor portion and a circumferential portion, wherein the circumferential portion of the centering unit operably engages a distal end portion of the bearing assembly such that the bearing assembly is fixed relative to the wheel hub in the direction parallel to the axle body, and wherein the distal end portion is the outer bearing ring and the outer bearing ring is fixed relative to the wheel hub in the direction parallel to the axle body.

15. The wheel bearing assembly for a vehicle according to claim 14, wherein the centering unit further comprises a flange portion.

16. The wheel bearing assembly for a vehicle according to claim 15, wherein the flange portion extends in a radial direction, away from the circumferential portion.

17. The wheel bearing assembly for a vehicle according to claim 16, wherein the floor portion of the centering unit comprises an opening that is concentric to the axis of rotation and adapted for closure by a closure element.

18. The wheel bearing assembly for a vehicle according to claim 14, wherein the floor portion of the centering unit comprises an opening that is concentric to the axis of rotation and adapted for closure by a closure element.

* * * * *